UNITED STATES PATENT OFFICE.

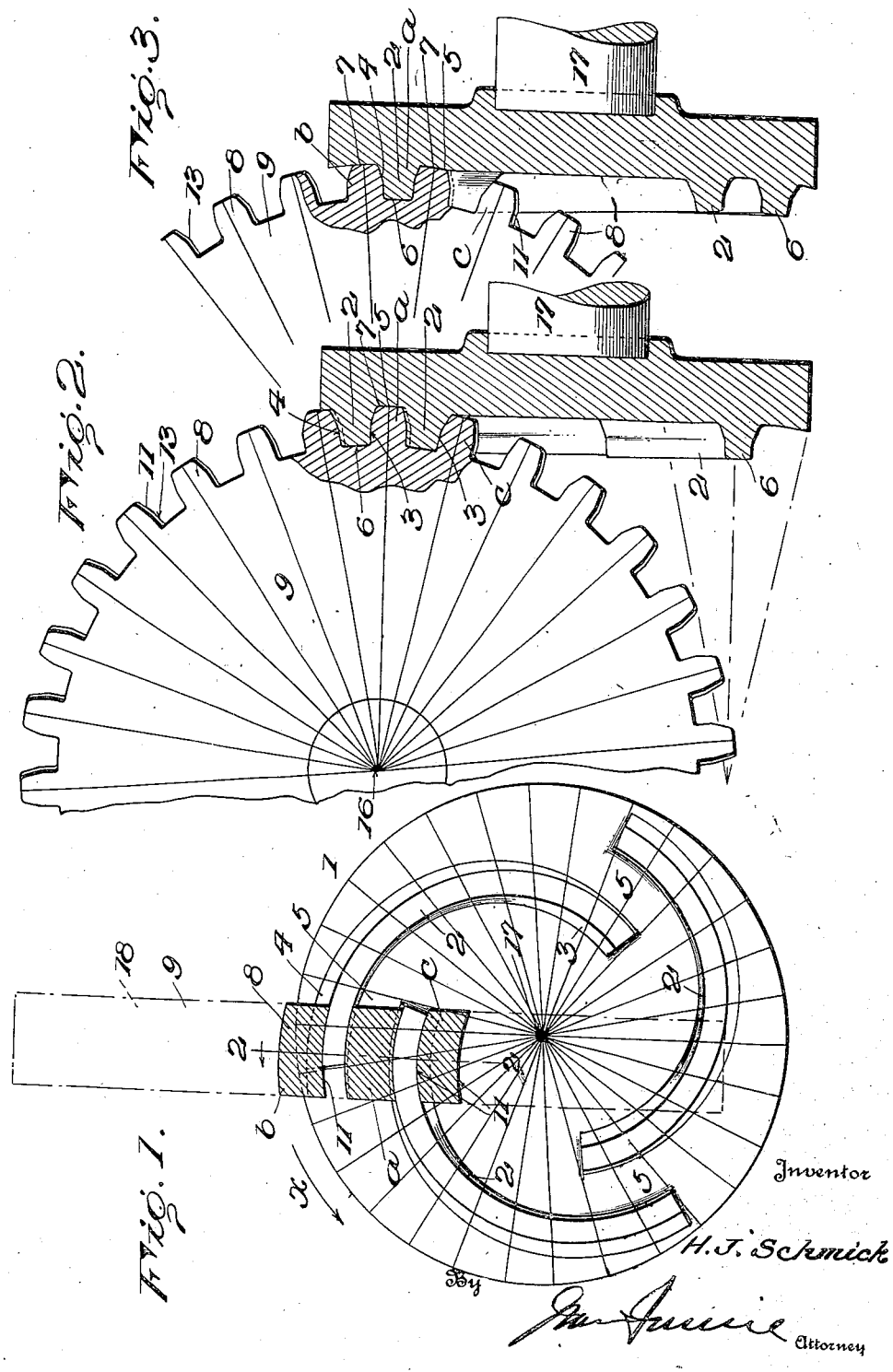

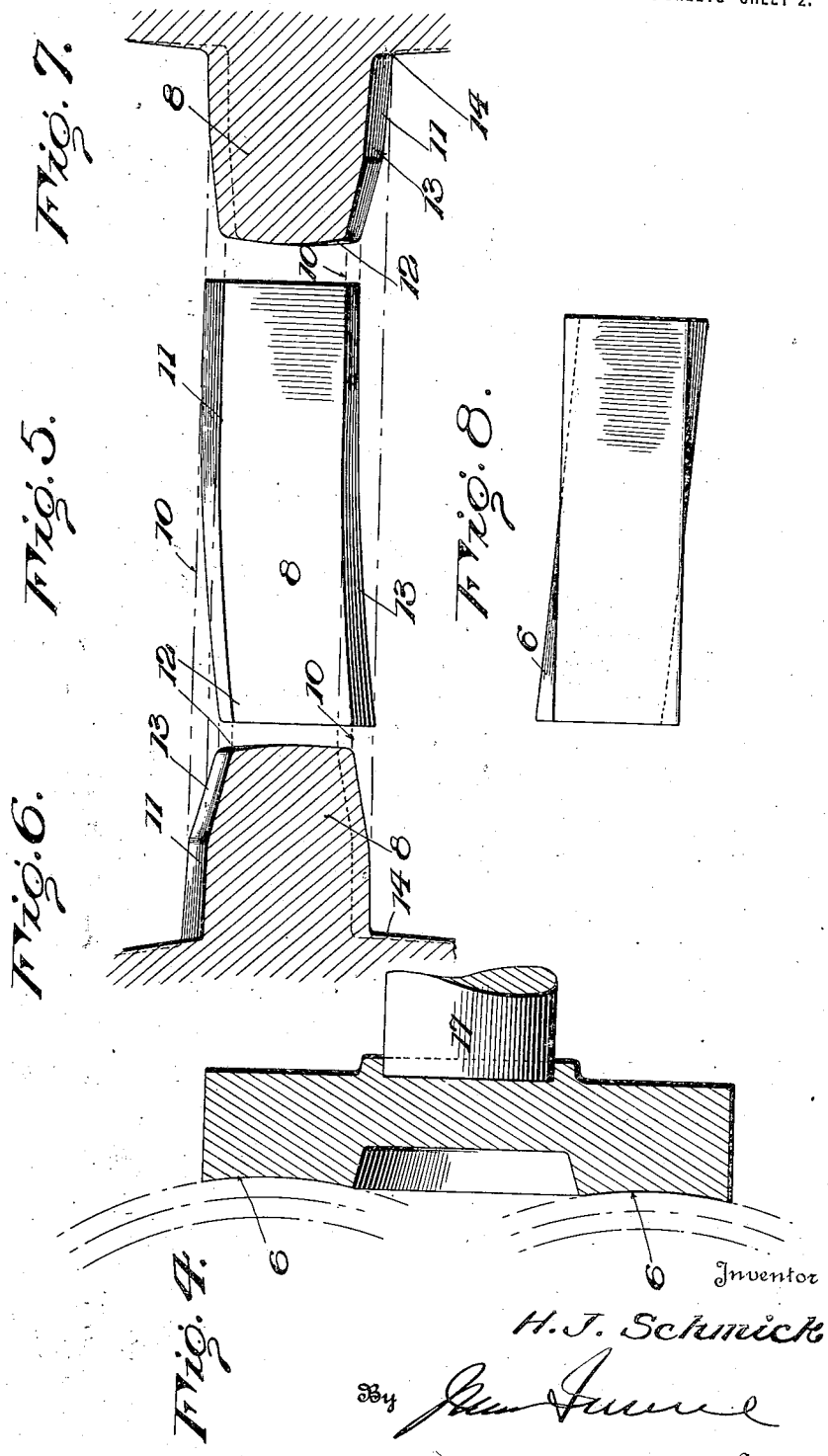

HENRY J. SCHMICK, OF WILLIAMSPORT, PENNSYLVANIA.

CAM GEARING.

1,422,000. Specification of Letters Patent. Patented July 4, 1922.

Application filed March 1, 1918. Serial No. 219,809.

*To all whom it may concern:*

Be it known that I, HENRY J. SCHMICK, a citizen of the United States, residing at Williamsport, in the county of Lycoming and State of Pennsylvania, have invented certain new and useful Improvements in Cam Gearing, of which the following is a specification.

This invention relates to improvements in gearing.

In my Patent No. 755,051, dated Mar. 22, 1904 is disclosed a gearing, similar to the improvement about to be described. In the construction shown and described in the patent the teeth of the gear wheel intermesh with the radio-helical members, but because of the constantly changing curvature of the cams and the different radii from the center of the head, it was found to be impossible to provide a tooth which would at all times, when in cooperative relation with the cams, snugly fit and accurately correspond with the coacting cam and angular surface or surfaces.

In my present improvement, each tooth bears the same cooperative relation with the curvature and angle or angles of the cam or cams, whether in mesh at a time when engaging the greatest or the smallest radius of a cam. The result is when ever a tooth or teeth of the gear mesh with a cam or cams, the contacting surfaces are parallel, and the same sliding relation between the parts is at all times maintained.

The prime object of the invention is to provide a cam or cams, and a cooperating gear, the intermeshing surfaces of which are so shaped that in any meshing position, the same sliding fit exists.

A further object of this invention is to provide in gearing, intermeshing elements so constructed and arranged as to produce a constant uniform leverage action.

The invention also comprehends improvements in the details of construction and arrangement of parts which will be hereinafter described and particularly pointed out in the claims.

In the drawings:—

Fig. 1 is a face view of the head having the cam elements thereon and illustrating the teeth of a cooperating gear wheel in section, and the body of the gear in dotted lines.

Fig. 2 is a section on the line 2—2 of Fig. 1,

Fig. 3 is a similar view, but illustrating the parts in position after the cam head has turned about one quarter of a revolution.

Fig. 4 is a section of the head before the cam elements are formed,

Fig. 5 is an enlarged plan view of one of the teeth of the gear wheels,

Fig. 6 is an end view of same,

Fig. 7 is a similar view looking from the opposite end.

Figure 8 is a diagrammatic plan view of a gear tooth.

Referring to the drawings, the cam head 1 has formed thereon a plurality of cams 2. These cams are eccentric to the axis of the head, and each is identical in outline, and therefore but one will be described.

The cam is of such contour that it is difficult to describe or to show it in the drawings because of the varying curvature of its center line and the varying inclination of its side faces and it can best be defined by the method of producing it, to meet the requirements necessary to accurate meshing with the surfaces of the teeth of the gear wheel. The curvature of the center axis of the cam may be approximated by joining a number of forming curves struck with radii which constantly decrease in length as the cam approaches the axis of the head from its starting point near the periphery of the head. The inner working surface of the cam is inclined, the greatest inclination being at the inner end from which point it gradually decreases toward the outer end, as shown at 3. This same angularity occurs on the outer working surface of the cam, except it is reversed, as shown at 4, the greatest angularity being at the outer end near the periphery of the head.

The inner or root end of one cam overlaps and is spaced from the outer end of the adjacent cam, the walls of the space 5 between the two cams being parallel, to receive the tooth of a coacting gear wheel. While the walls of the space are parallel, they nevertheless form a twist, due to the difference in the radius of the two cams, and the fact that the angles vary.

To insure the cams fitting snugly around the periphery of gear teeth, and in the bottoms of the spaces between the latter, it is essential that the faces of the cams, and the surface of the head adjacent the base of the cams be curved as shown at 6 and 7. These curved surfaces produce in effect a twist in the cams, as shown diagrammatically in Fig.

8. This curvature or twist is produced by the action of the cutters when cutting the cams on the head, and although the process of generating the cams does not constitute the subject matter of this application this feature is vitally important, as it is impossible to produce the constantly changing curvature to fit the gear teeth after the cams are formed. The changing and twisted curved shape is essential, because of the various radii of the cams, and the constantly changing radial position of the teeth of the gear wheel, as will later appear.

The head as shown in the drawings is provided with three cams, but obviously more or less may be employed, this depending upon how many teeth of a gear are to be actuated in one revolution of the head, and the particular work desired of the gearing. In any event the cams each have the same physical characteristics previously described, Cooperating with the cam head is a gear wheel, the teeth of which are specially formed, and which will now be described in detail.

It is to be borne in mind that the walls of the curved space 5, between the overlapping ends of the cams are, in effect twisted. Correspondingly the teeth 8 of the gear wheel 9 are curved and twisted to fit the working cam surfaces. Since the teeth are all exactly alike, for the purpose of clearness I will describe but one, and a wall of the space between two teeth.

Referring specifically to Figs. 5, 6 and 7, which illustrate views of a gear tooth, the dot and dash lines 10 represent the transverse alignment of the corners of the teeth, parallel with the axis of the gear wheel. The tooth is curved transversely as shown at 11 to conform to the curved edges of the cams 2. The peripheral surface of the tooth is twisted, as at 12, due to the transverse curvature or twist 11, of the body of the tooth. The side surfaces 13, of the tooth are oppositely inclined and twisted to engage the working surfaces of the cams. The twists of the side surfaces are reversed but the degree of angularity is approximately the same.

The wall 14 of the space between the teeth is twisted to correspond to the twist 12, of the peripheral surface of the tooth. This twist is due to the angle of the teeth, and the curvature of the peripheral wall 14.

The various angles and curves of the surfaces of the teeth form a construction which accurately fit, or correspond to the angular and curved working surfaces of the cams, irrespective of the radial position of the cams with reference to the gear wheel.

The axis of the shaft 16, of the gear wheel is at right angles to the axis of the shaft 17, of the cam head, but the axes are out of alignment. The axis of shaft 16, is in alignment with the center of the space 5 between two overlapping cams, as shown by the dotted line 18, in Fig. 1, while the axis of the shaft 17 is approximately or nearly in alignment with one face of the gear wheel as shown in Fig. 1. While this last mentioned relationship between the gear wheel and the cam head is preferable, it is not absolutely essential, as the gear teeth and the cams may be cut to mesh, when the gear wheel is positioned toward or from the axis of shaft 17. The salient feature is that the teeth and the walls of the cams be of the same curvature and angularity to slidably fit at all times.

To appreciate the importance of the construction, it may be stated that in gearing of this type it is a physical impossibility to cut the cams and produce the necessary angles and curves on one machine, and cut the gears on another machine, and make them intermesh and maintain the same uniform relationship at all times, even though the curves and angles be theoretically worked out. It has been found in practice that the solution of the problem is to first provide a cutter in the form of a gear wheel, and rotate such a cutter in unison with a prepared blank, such as shown in Fig. 4 to cut the cams. Then convert the cams into cutting edges, and rotate the head in unison with a gear blank to cut the twisted teeth, as fully set forth in my applications for patents Serial Nos. 873,928 and 112,550 filed Nov. 25, '14 and Aug. 1, '16, respectively, and in my application for patent executed December 1, 1917.

In this way the various curves and twists of the cams and teeth are made to absolutely conform, consequently when in meshing relation, the teeth and cams have the same sliding fit at all times.

In operation, let it be assumed that the gear is in the position shown in Figs. 2 and 3. That is, a tooth $a$, is in a space 5, between two cams, and a tooth $b$, is in engagement with the outer working surface of one of the cams, while a tooth $c$, is in meshing engagement with the inner working surface of the adjacent cam. The peripheral surfaces 12 and 14 of the teeth correspondingly fit and engage the curved surfaces 6 and 7 of the cam head as shown. When in this meshing relation the various angles and curves of both cams and teeth fit each other, and slide between each other, when the shaft 17 is rotated. Upon further rotation, of the cam head, in direction of the arrow X, say for illustration, approximately a quarter turn, as shown best in Fig. 3, there is but one cam engaging the teeth of the gear wheel, and the latter has been partially rotated a circumferential distance equal to the radial throw of the cams. But by reason of the twist of the cams, and the teeth, the same fit, or relative meshing relation between the surfaces is maintained. That is, while the tooth $a$ has been removed from the inner working surface of one of the cams, it is, with the tooth $c$, in operative relation with the single cam, as shown in Fig. 3.

The curves and angles of the intermeshing elements are such that in the arcuate movements of both cam head and gear wheel, the changing angles and curves when brought into contact are concentric and parallel at the contacting point, with the result that the uniform sliding action and the consequent throw or leverage of the cams on the teeth is at all times the same.

Of course the cams are so disposed that in the rotation of the head, the outer end of one cam engages the teeth before the inner end of the adjacent cam leaves the teeth, and vice versa.

From the foregoing description, it will be seen that I have provided a gear, and cooperating cam element, in which the teeth and cams always maintain the same relation, irrespective of the changing radii, in exactly the manner that a concentric flange fits a groove on an adjacent element. This results in a uniform movement of the gear wheel, and the utilization of the full effective radial leverage action of the cams on the teeth. Obviously by providing the meshing teeth so that they will at all times have the same sliding fit with the cams, undue friction is avoided, and the full force of the leverage action is maintained.

What I claim is:—

1. In gearing, the combination of a plurality of spirally disposed cams having overlapping ends, the working faces of said cams being twisted substantially as described, and a gear wheel having teeth twisted transversely and circumferentially to fit the twisted cam surfaces.

2. In gearing, the combination of a head having cams the ends of which overlap, the working faces of said cams being twisted circumferentially and the outer edge surfaces and the portions of the head adjacent to the base thereof being radially curved, and a gear wheel having twisted teeth to engage the working surfaces of the cams, the peripheral surfaces of the teeth and the walls of the spaces between the teeth fitting the radial curvature of the cams and head.

3. A gear wheel, each tooth of which is transversely curved and has twisted sides produced by rotating it in unison with a cutter head having cam shaped cutters, substantially as described, whereby the body portion of each tooth is segmentally curved and disposed tangentially and at an angle to the axis of the wheel.

4. In gearing, the combination of a head having spirally curved cams on one face, the ends of adjacent cams overlapping with a space between them and the side walls of each cam being circumferentially twisted, and a gear wheel having teeth meshing with the cams, each tooth being transversely curved and twisted to correspondingly engage the twisted surfaces of the cams at any radial point in their circumferential length.

5. In gearing, the combination of spiral cams each having oppositely disposed side walls of changing inclination in the form of a twist, and a gear wheel having teeth each of which has the form of a twist and is curved on its active edge surfaces to correspond to the twisted surfaces of each cam.

6. A gear wheel, each tooth of which is transversely curved and provided with oppositely inclined side walls in the form of a twist and so disposed angularly that the intervening body portion of the tooth is at an angle to the axis of the wheel, in combination with a plurality of cams shaped so as at all times when in meshing relation with the gear teeth to accurately engage upon their contacting surfaces.

In testimony whereof I affix my signature.

HENRY J. SCHMICK.